United States Patent [19]

Miller

[11] Patent Number: 4,496,270
[45] Date of Patent: Jan. 29, 1985

[54] CHAIN CAP FOR FORMING A STABLE LOAD

[75] Inventor: Curtiss W. Miller, Marne, Mich.

[73] Assignee: Urban Systems Streetscape, Inc., Grand Rapids, Mich.

[21] Appl. No.: 422,456

[22] Filed: Sep. 20, 1982

[51] Int. Cl.³ .................. B60P 7/12; B65D 81/00
[52] U.S. Cl. .................. 410/32; 108/55.3; 206/511; 206/821; 211/49 S; 248/499; 410/39; 410/42
[58] Field of Search .............. 24/287; 108/55.1, 55.3, 108/91; 211/49 S, 60 R, 60 S, 194; 206/443, 446, 509, 511, 512, 515, 821; 248/499, 505; 312/111; 410/31–39, 41, 42, 47, 49, 50, 96, 97, 98

[56] References Cited

U.S. PATENT DOCUMENTS

| | | | |
|---|---|---|---|
| 2,364,007 | 11/1944 | Stanton | 206/512 X |
| 2,850,182 | 9/1958 | Tetyak | 206/443 |
| 3,104,085 | 9/1963 | Skladany | 410/49 |
| 4,000,704 | 1/1977 | Griffin, Jr. | 108/53.3 X |
| 4,099,617 | 7/1978 | Nist, Jr. | 206/443 |
| 4,099,626 | 7/1978 | Magnussen, Jr. | 211/60.1 |
| 4,195,732 | 4/1980 | Bell | 206/821 X |
| 4,378,923 | 4/1983 | Takei | 206/443 X |
| 4,385,695 | 5/1983 | Champlin et al. | 206/821 X |

Primary Examiner—Robert B. Reeves
Assistant Examiner—David F. Hubbuch
Attorney, Agent, or Firm—Price, Heneveld, Huizenga & Cooper

[57] ABSTRACT

A chain cap is provided for forming a stable load suitable for vehicular travel from a plurality of elongate articles. A plurality of the chain caps are provided for encompassing the elongate articles. Each of the chain caps are provided with interfitting surfaces which interlock when the chain caps are stacked, tie bar surfaces which define tie bar channels extending between adjacent chain caps and conformal surfaces for engaging the elongate articles. Each of the elongate articles is engaged by at least a pair of the chain caps, the conformal surfaces of the chain caps engaging opposing sides of the elongate articles. A first planar array of the elongate articles is established, the elongate articles being disposed in a roughly parallel relationship with pairs of chain caps being adjacently disposed for defining a tie bar channel therebetween. A tie bar is mounted in the tie bar channel, the tie bar extending between adjacent pairs of chain caps. A second planar array of elongate articles is established atop the first planar array of objects by stacking the chain caps of the first planar array of articles atop the chain caps of the second planar array of articles. The interfitting surfaces of the chain caps prevent lateral movement between chain caps stacked one atop the other and the tie bars stabilize articles in a side-by-side relationship. A clamping tension band surrounds the chain caps for securing the elongate articles into a stable load suitable for vehicular travel.

15 Claims, 9 Drawing Figures

CHAIN CAP FOR FORMING A STABLE LOAD

BACKGROUND OF THE INVENTION

The present invention relates generally to arrangements for forming a stable load suitable for vehicular travel from a plurality of elongate articles and more particularly, is directed to a chain cap for use with such articles, and a method for forming a stable load therewith.

Various techniques are known in the prior art for shipping elongate objects formed from structural steel or similar materials. In the case of large urban structures such as street light supports, sign supports, traffic light supports, or the like, it is desirable to finish the structure prior to shipment so that a superior, factory applied corrosion resistant finish can be placed on the structure which will preserve its function and aesthetic value during years of outdoor service. However, shipping techniques that involve moving these structures on a flatbed truck or a rail car often mar the structures and seriously impair the corrosion protecting finish applied at the factory. Techniques employed in the prior art for stabilizing the load and preventing this marring problem due to load shifting and sudden stops, have involved building wooden cribs and padding the cribs with strips of carpeting or the like. However, these techniques have been largely ineffectual and have resulted in other problems such as melting of the carpeting material and bonding of the same to the structure due to the tremendous loads placed on the interface between these heavy, elongate articles and the cribbing material.

SUMMARY OF THE INVENTION

According to the present invention, these and other problems in the prior art are solved by provision of a unique chain cap and a method for forming a stable load therewith. A plurality of the chain caps are provided for encompassing the elongate articles. The chain caps are provided with interfitting surfaces which interlock when the chain caps are stacked one atop the other, tie bar surfaces which define tie bar channels when the chain caps are stacked in a side-by-side relationship and conformal surfaces for engaging the elongate articles. Each of the elongate articles is engaged with at least one pair of chain caps, the conformal surfaces of the chain caps engaging opposing sides of the elongate articles. A first planar array of the elongate articles is established atop a flatbed or the like, the elongate articles being disposed in a roughly parallel fashion with pairs of chain caps adjacently disposed for defining a tie bar channel extending therebetween. A tie bar is mounted in the tie bar channel, the tie bar extending between adjacent pairs of chain caps. A second planar array of elongate articles is then established atop the first planar array of elongate articles by stacking the pairs of chain caps one atop the other. The interfitting surfaces of the chain caps prevent lateral movement between articles stacked one atop the other and the tie bar surfaces and tie bars stabilize the articles stacked in a side-by-side relationship. The number of articles disposed in each planar array and the number of planar arrays stacked one atop the other may be varied according to the dimensions of the elongate articles and the size of the load that can be accommodated by the flatbed or the like which is being used to transport the load. At least one clamping tension band is provided which encompasses the plurality of chain caps and secures the chain caps and the elongate articles into a stable load suitable for vehicular travel. Furthermore, according to more narrow aspects of the invention, a pair of apertured flanges are provided on the exterior of the chain caps for creating a seat for stabilizing the tension band or chain which is used to clamp the load to a vehicle. The apertures in the flanges may then be used to secure one or more transversely extending tension bands which lock the clamping band or chain in place.

DESCRIPTION OF THE PREFERRED EMBODIMENTS CHAIN CAP

Figure 1:
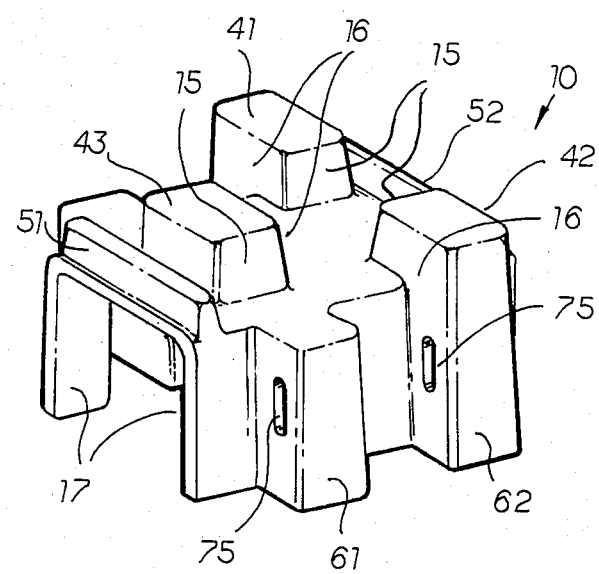
FIG. 1 is a perspective view of one embodiment of the chain cap of the present invention.
Figure 6:
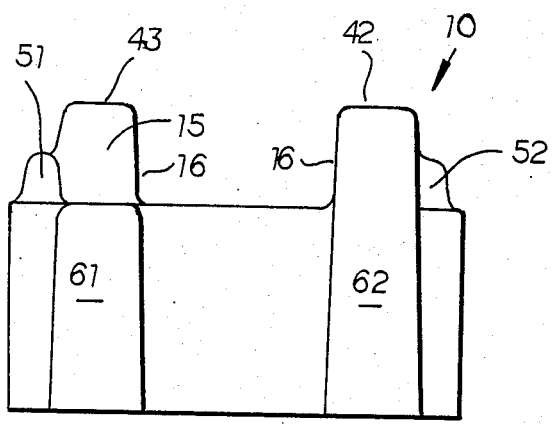
FIG. 6 is a front elevation of the chain cap illustrated in FIG. 1.
Figure 5:
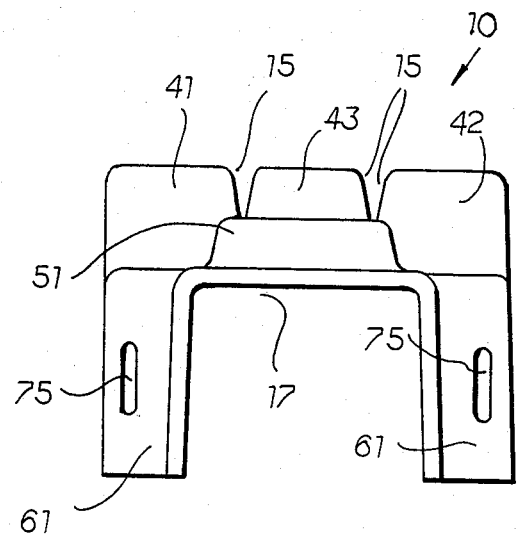
FIG. 5 is an end view of the chain cap illustrated in FIG. 1.
Figure 2:
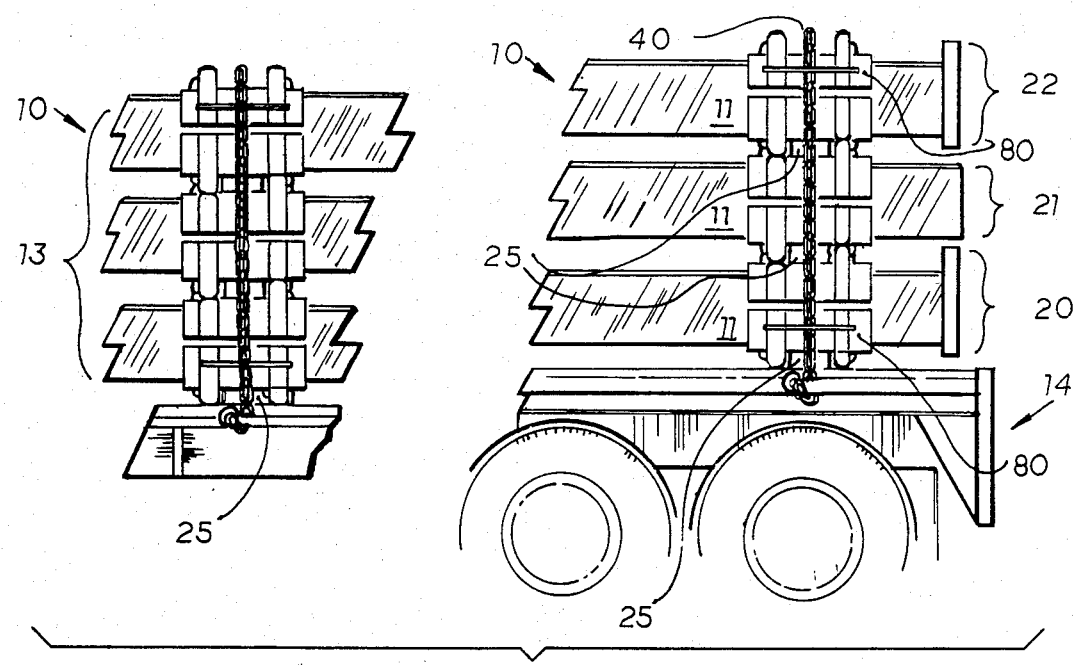
FIG. 2 is an elevational view of a stable load suitable for vehicular travel formed with the chain cap of the present invention.
Figure 3:
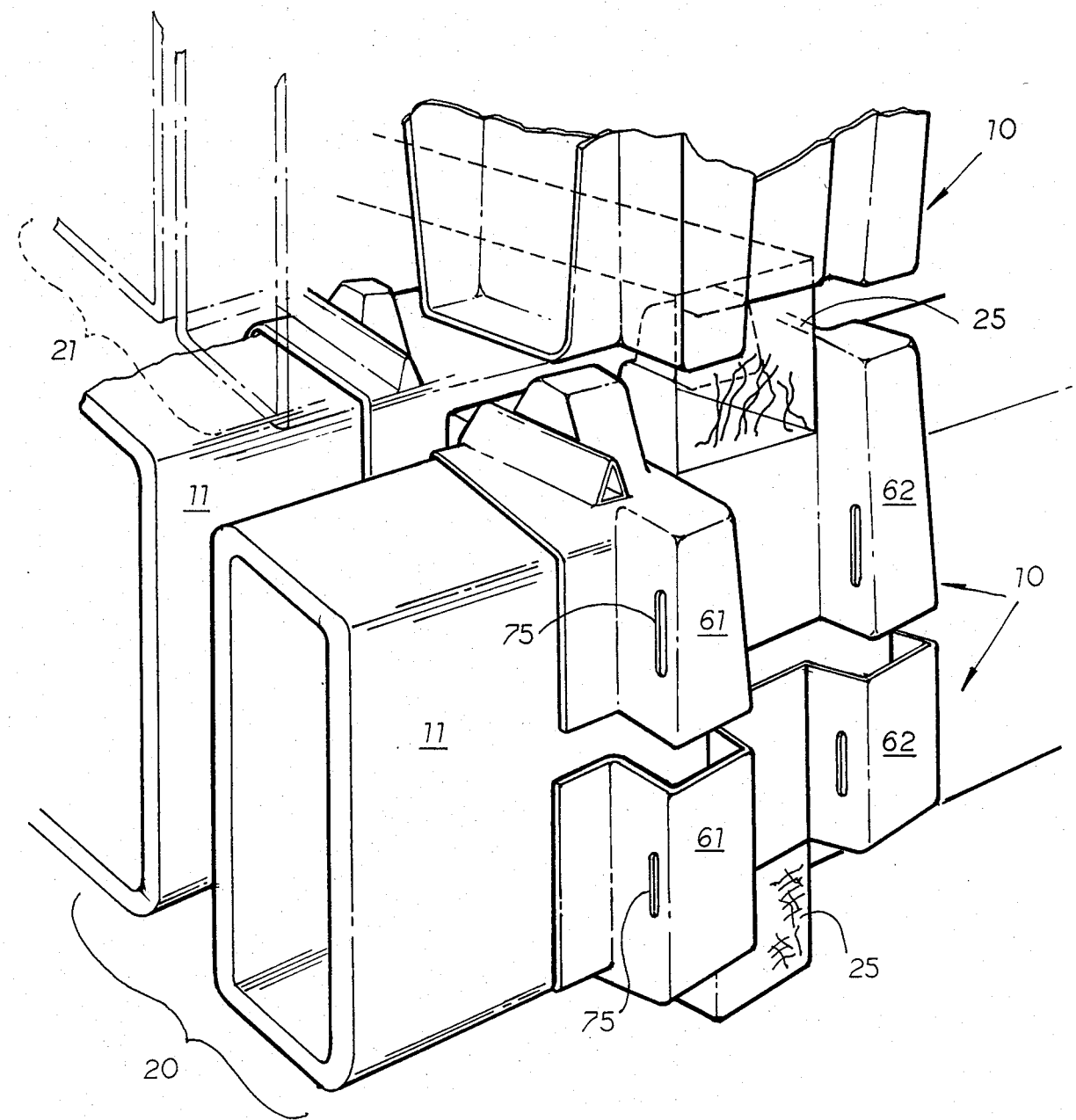
FIG. 3 is a perspective view of a portion of a load formed with the chain cap of the present invention.

With reference now to the figures, and in particular, FIGS. 1, 2 and 3, the chain cap of the present invention is illustrated at 10. The chain cap 10 comprises a thin wall body formed from a polymeric material in a vacuum-assisted thermal forming molding process. Preferably, the body is formed from a medium molecular weight distribution, high density polyethelene. However, it should be appreciated that other materials and methods may be suitable for forming the chain cap 10.

As best illustrated in FIGS. 2 and 3, normally a plurality of chain caps 10 are used to form a stable load 13 from a plurality of elongate articles 11, which are suitable for vehicle travel on, for example, a flatbed trailer illustrated at 14 in FIG. 2. Each of the chain caps 10 is provided with a plurality of interfitting surfaces 15 which interlock when the chain caps are stacked one atop the other to prevent lateral movement therebetween. Each of the chain caps 10 also include tie bar surfaces 16 which define tie bar channels when the chain caps 10 are stacked in a side-by-side relationship. Conformal surfaces are disposed at 17 for engaging each of the elongate articles 11. Each of the elongate articles 11 are engaged by at least two chain caps 10, the conformal surfaces 17 of the chain caps 10 engaging opposing sides of the elongate articles 11.

Figure 4:
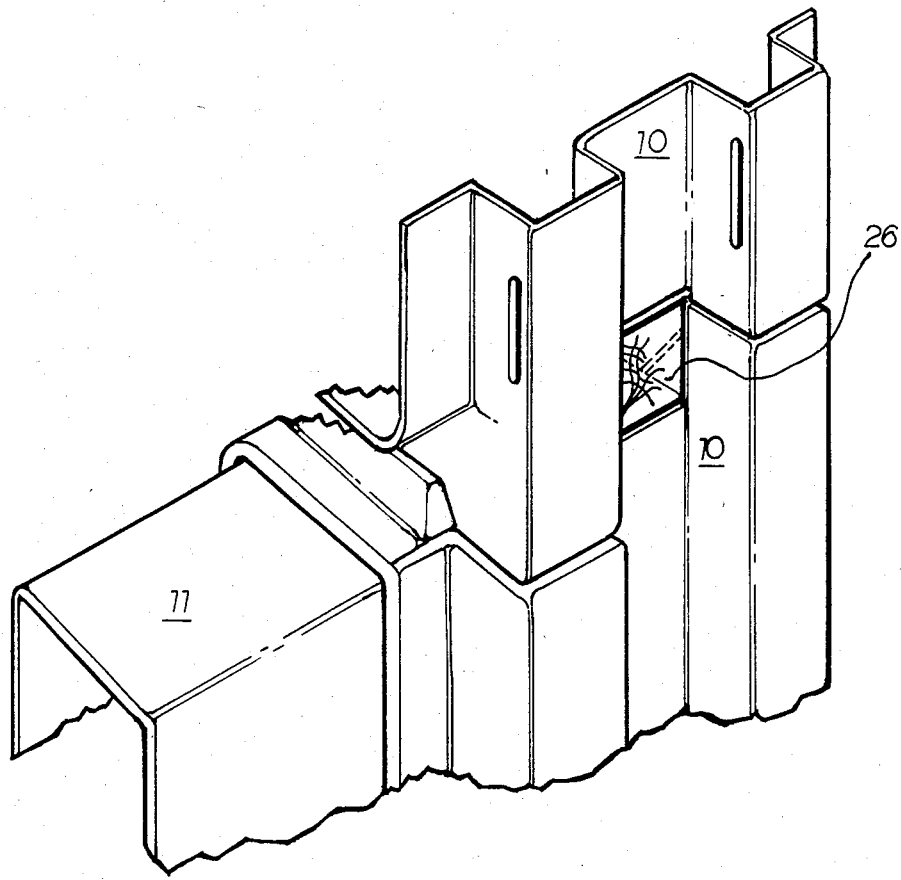
FIG. 4 is another perspective view of a section of a load formed with the chain cap of the present invention.

In establishing the load formed with the chain cap of the present invention, a first planar array of the elongate articles 11 is formed at 20. The elongate articles forming the first planar array of articles 20 are disposed in a roughly parallel fashion with pairs of chain caps being disposed in side-by-side relationship for providing a tie bar channel therebetween. Tie bars 25 are mounted in the tie bar channel defined by the surfaces 16 on the chain caps 10, the tie bars 25 extending between adjacent pairs of chain caps 10. Thereafter, a second planar array of objects 21 is disposed thereatop the first planar array of objects 20. The pairs of chain caps disposed on the second planar array of objects 21 are stacked atop the chain caps disposed in the first planar array of objects 20. With reference now also to FIG. 4, it is illustrated that where tie bars 26 are provided with suitably small dimensions, the interfitting surfaces 15 disposed on each of the chain caps 10 interengage or interlock to prevent lateral movement between chain caps stacked one atop the other. Furthermore, the tie bars 25 and 26 in both the loads illustrated in FIGS. 3 and 4 engage the tie bar surfaces 16 of each of the chain caps 10 to stabilize the first and second planar arrays of elongate articles in a side-by-side relationship. The load illustrated in FIG. 3 employing the thicker tie bars may be used for example when the elongate articles 11 include appendages, arms or flanges which create a clearance problem and which must be separated to prevent metal-to-metal contact. However, wherever possible, the smaller tie bars 26, illustrated in FIG. 4, are employed to insure interengagement or interlocking of the surfaces 15 of the chain caps 10. Also, the tie bars 26 serve to distribute and transmit the normal loading or downward force on the articles between articles stacked one atop the other.

As best illustrated in FIG. 2, the load is completed with a clamping tension band 40 which encompasses the first and second planar arrays of elongate objects 20 and 21 to secure the same into a stable load which is suitable for vehicular travel. It should be clear that the number of articles disposed in each planar array of articles is dependent on the size of the trailer used to transport the articles, the dimensions of the article and other similar considerations. Furthermore, it should also be obvious that the number of planar arrays of objects which are stacked one atop the other is variable and indeed, as illustrated in FIG. 2, three or more planar arrays of objects may be stacked atop the trailer 14.

Figure 7:
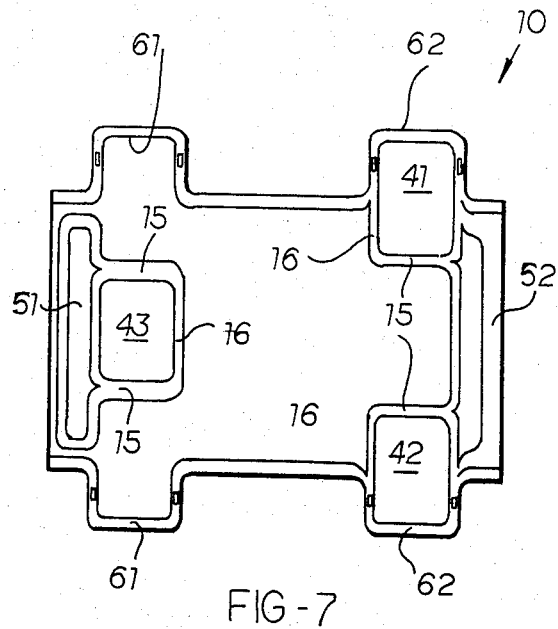
FIG. 7 is a top plan view of the chain cap illustrated in FIG. 1.
Figure 8:
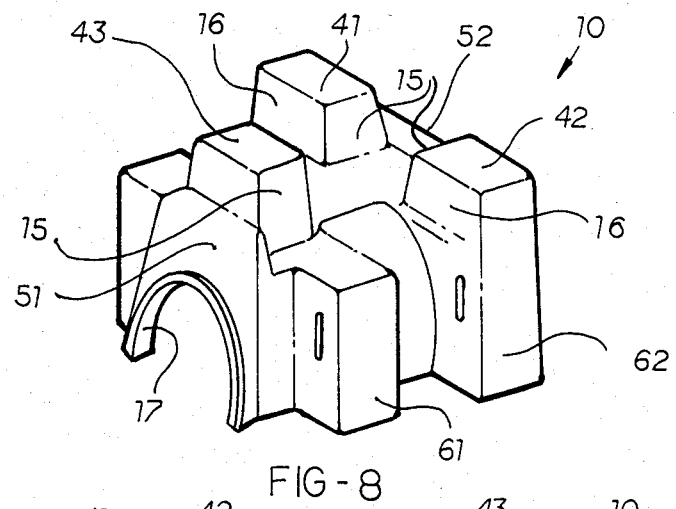
FIG. 8 is a perspective view of another chain cap constructed according to the present invention.
Figure 9:
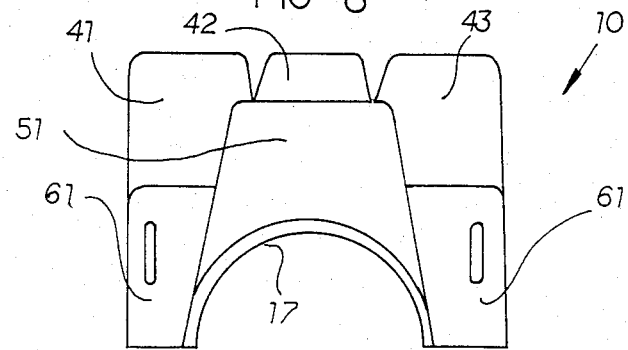
FIG. 9 is an end view of the chain cap illustrated in FIG. 8.

With reference now also to FIGS. 5-9, the chain cap 10 of the present invention is illustrated in further detail. The chain cap illustrated in FIGS. 1 and 5-7, is provided with conformal surfaces 17 which are rectangular in shape for engaging elongate articles 11 which include long sections formed from rectangular steel tubing. In the embodiment of the chain cap illustrated in FIGS. 8 and 9, the conformal surfaces 17 are cylindrical in shape for engaging elongate articles 11 having a cylindrical tubular structure. The conformal surfaces 17 are used to engage opposing sides of each of the elongate articles 11 and the conformal surfaces 17 are thus disposed on the side of the chain cap 10 opposite the interfitting surfaces 15 and the tie bar surfaces 16. As best illustrated in FIGS. 1, 8 and 7, preferably the interfitting surfaces and the tie bar surfaces comprise first, second and third generally rectangular projections 41, 42 and 43 formed in and extending from one side of the chain cap 10. The third rectangular projection 43 is sized such that when the chain caps are stacked one atop the other with the projections facing one another, the third projection 43 extends between the first and second rectangular projections 41 and 42 for stabilizing the chain caps in a lateral direction by interengagement of the surfaces 15 which form the relatively planar faces of the rectangular projections 41-43. Preferably, the first and second generally rectangular projections are disposed on one end of the chain cap 10 and the third generally rectangular projection 43 is disposed on the other end of the chain cap 10 so that the sides 16 of the rectangular projections 41-43 define the tie bar channel therebetween.

Preferably, the interfitting surfaces disposed on each of the chain caps 10 further comprise first and second generally elongate projections 51 and 52. The first elongate projection 51 is disposed adjacent the third rectangular projection 43 and the second elongate projection 52 is disposed adjacent the first and second rectangular projections 41 and 42. More particularly, the second elongate projection 52 extends in a web-like fashion between the first and second generally rectangular projections 41 and 42 to complete a rectangular socket within which the third rectangular projection 43 is securely mounted when a tie bar is disposed within the tie bar channel and a pair of chain caps are stacked one atop the other with the tie bar extending therebetween and the interfitting surfaces of both chain caps facing one another. The elongate projections 51 and 52 abut when the third rectangular projection 43 is thus inserted in the rectangular socket defined by the surfaces 15, the tie bar and the elongate projection 51 to help distribute the weight of the articles stacked thereatop. The sidewalls of the chain cap and the sidewalls of the projections 41, 42, 43, 51 and 52 are provided with at least a slight draft to facilitate molding of the chain cap, stacking of the interfitting surfaces during use and stacking the chain caps in an interleaved fashion during return shipment.

The chain caps 10 further include a means for receiving the clamping tension bands 40 comprising first and second generally parallel flanges 61 and 62 projecting from the exterior of each of the chain caps 10. The clamping tension band 40 received by the chain caps may, for example, comprise a chain clamped around the chain caps 10 and tensioned in any suitable fashion for securing the load to the trailer 14 illustrated in FIG. 2. The flanges 61 and 62 are further provided with apertures 75 for receiving one or more transverse tension bands 80, illustrated in FIG. 2. The transverse tension bands 80 may comprise, for example, steel bands which are used to engage the first and second flanges 61 and 62 and encompass the clamping tension band 40 to secure the same therebetween. Also, the flanges may be used to mount and stabilize a protective sheet of wood, plastic etc. (not illustrated herein) for protecting the sides of a load from the clamping chain. This protective sheet can be nailed into the ends of the tie bars and/or clamped in place by a clamping chain.

METHOD FOR FORMING A STABLE LOAD

With reference now to FIGS. 2, 3 and 4, the method for forming a stable load suitable for vehicular travel from the chain cap 10 of the present invention and a plurality of elongate articles 11 will be described in further detail. It should be understood that the method will be described in terms of forming at least two planar arrays of elongate objects stacked one atop the other with each elongate object being encompassed by at least one pair of chain caps. However, as illustrated in FIG. 2, four or more chain caps may be used to encompass longer articles at one or more positions along their length to additionally secure and stabilize the load to the trailer 14. The first step of the method involves providing a plurality of chain caps 10 for encompassing each of the elongate articles 11, the chain caps 10 being provided with interfitting surfaces which interlock when the chain caps are stacked one atop the other, tie bar surfaces which define tie bar channels when the chain caps are stacked in a side-by-side relationship, conformal surfaces for engaging the exterior of the elongate articles 11. Normally a first tie bar is disposed on the bed of the trailer 14 and a first planar array 20 of elongate articles 11 is formed thereatop. Normally this is accomplished by placing a first set of chain caps with the interfitting surfaces and tie bar surfaces facing downwardly atop the tie bar placed on the top surface of the trailer. The elongate articles comprising the first planar array of elongate articles are then placed within the upwardly facing conformal surfaces of the chain caps thus arranged on the flatbed trailer, and the array is completed by placing a second set of the chain caps thereover, with the interfitting surfaces facing upwardly and the conformal surfaces facing downwardly. Thereafter, a second tie bar is mounted in the tie bar channel thus defined by adjacent pairs of chain caps, the tie bar extending therebetween to stabilize adjacent pairs of chain caps. A second planar array of elongate articles is then established thereatop by stacking additional chain caps with interlocking and tie bar surfaces facing downwardly and conformal surfaces facing upwardly, adding the elements of the second planar array of elongate objects thereatop and then capping the second array of elongate objects with chain caps having downwardly facing conformal surfaces. This structure is suitable for receiving the clamping tension band 40, but as illustrated in FIG. 2, additional planar arrays of objects may be added and clamped to the load with the clamping tension band 40. After each of the stacks of chain caps 10 are encompassed by a tension band 40, as illustrated in FIG. 2, one or more transversely extending tension bands 80 may be used to engage the apertured flanges between which the clamping tension band 40 is received and encircle the clamping tension band 40 to additionally secure the load together. However, it should be understood that the transverse extending bands 80 are optional, since normally the clamping force of the clamping tension bands 40 is sufficient to stabilize the load and retain the first tension band 40 between the first and second sets of flanges 61 and 62.

The above description should be considered exemplary and that of the preferred embodiment only. Modifications will occur to those who make and use the invention. It is intended to include within the scope of the present invention all such modifications that come within the proper scope of the appended claims. The true scope and spirit of the present invention is to be determined with reference to the appended claims.

The embodiments of the invention in which an exclusive property or privilege is claimed are defined as follows:

1. A chain cap for forming a stable load suitable for vehicular travel comprising:
   a body;
   interfitting surfaces disposed on said body, said interfitting surfaces interlocking to prevent lateral movement thereof when a plurality of said chain caps are stacked one atop the other;
   a tie bar surface disposed on said body for defining a channel for receiving tie bars when a plurality of said chain caps are arranged in a side-by-side relationship;
   a conformal surface disposed on said body for engaging an article forming a part of the load;
   pairs of said chain caps being adapted for engaging opposing sides of an article forming a part of the load, so that the articles may be stacked one atop the other and side-by-side to form a stable load with said interfitting surfaces preventing lateral movement between articles stacked one atop the other and tie bar surfaces engaging tie bars to stabilize articles stacked in a side-by-side relationship;
   said interfitting surfaces and said conformal surfaces being disposed on opposing sides of said chain cap said interfitting surfaces comprising first, second and third projections extending from one side of said chain cap, said third projection extending between said first and second projections on each chain cap stacked thereatop for stabilizing each of said chain caps in a lateral direction when a plurality of said chain caps are stacked with said interfitting surfaces facing; and
   means for receiving a clamping tension band for securing a plurality of said chain caps and a plurality of articles into a stable load suitable for vehicular travel.

2. The chain cap of claim 1 wherein said interfitting surfaces further comprise first and second generally elongate projections disposed on the same side of said chain cap as said first, second and third rectangular projections, said first elongate projection being disposed adjacent said third rectangular projection and said second elongate projection being disposed adjacent said first and second rectangular projections to define a rectangular socket for receiving said first rectangular projection when said chain caps are stacked one atop the other.

3. The chain cap of claim 1 wherein said means for receiving a clamping tension band comprises first and second generally parallel flanges projecting from the exterior of said chain cap for receiving and locating a clamping tension band therebetween.

4. The chain cap of claim 3 wherein said first and second generally parallel flanges are provided with apertures for receiving a transverse tension band which extends through said first and second flanges and encompasses said clamping tension band.

5. The chain cap of claim 1 wherein said first and second generally rectangular projections are disposed on one end of said chain cap and said third generally rectangular projection is disposed on the other end of said chain cap for defining said tie bar channel therebetween.

6. The chain cap of claim 1 wherein said chain cap comprises a thin wall structure formed from a polymeric material in a vacuum assisted thermo-forming molding process.

7. The chain cap of claim 6 wherein said chain cap is formed from a medium molecular weight distribution high density polyethylene.

8. A stable load of elongate articles suitable for vehicular travel comprising:
   a plurality of chain caps for encompassing said elongate articles, said chain caps being provided with interfitting surfaces which prevent lateral movement when said chain caps are stacked, tie bar surfaces which define tie bar channels and conformal surfaces for engaging said elongate articles;
   each of said elongate articles being engaged by a pair of said chain caps, said conformal surfaces of said chain caps engaging opposing sides of said elongate articles;
   a first planar array of said elongate articles, said first planar array of objects being disposed in a roughly parallel fashion with pairs of said chain caps being disposed in side-by-side relationship for providing a tie bar channel;

a tie bar disposed in said tie bar channel and extending between adjacent pairs of said chain caps;

a second planar array of said elongate articles with pairs of said chain caps disposed on opposing sides thereof, said second planar array of articles being formed by stacking chain caps of said second array of articles atop said chain caps of said first planar array of objects, whereby said tie bar surfaces of said chain caps of said second planar array engage said tie bar, and said interfitting surfaces on said chain caps of said first and second arrays of articles interengage to prevent lateral movement of said chain caps;

said interfitting surfaces and said conformal surfaces being disposed on opposing sides of said chain cap, said interfitting surfaces comprising first, second and third projections extending from one side of said chain cap, said third projection extending between said first and second projections on each chain cap stacked thereatop for stabilizing each of said chain caps in a lateral direction when a plurality of said chain caps are stacked with said interfitting surfaces facing; and a clamping tension band for encompassing said chain caps of said first and second planar arrays of elongate objects.

9. The stable load of claim 8 wherein said interfitting surfaces further comprise first and second generally elongate projections disposed on the same sides of said chain caps as said first, second and third rectangular projections, said first elongate projection being disposed adjacent said third rectangular projection and said second elongate projection being disposed adjacent said first and second rectangular projections to define a rectangular socket for receiving said first rectangular projection when said chain caps are stacked one atop the other with interfitting surfaces facing.

10. The stable load of claim 8 wherein said means for receiving a clamping tension band comprises first and second generally parallel flanges projecting from the exterior of said chain caps for receiving and locating a clamping tension band therebetween.

11. The stable load of claim 10 wherein said first and second generally parallel flanges are provided with apertures for receiving a transverse tension band which extends through said first and second flanges and encompasses said clamping tension band.

12. The stable load of claim 8 wherein said first and second generally rectangular projections are disposed on one end of said chain caps and said third generally rectangular projection is disposed on the other end of said chain caps for defining said tie bar channel therebetween.

13. The stable load of claim 8 wherein said chain caps comprise a thin wall structure formed from a polymeric material in a vacuum assisted thermo-forming molding process.

14. The stable load of claim 13 wherein said chain caps are formed from a medium molecular weight distribution high density polyethylene.

15. A stable load of elongate articles suitable for vehicular travel comprising:

a plurality of chain caps for encompassing said elongate articles, said chain caps being provided with interfitting surfaces which prevent lateral movement when said chain caps are stacked, and conformal surfaces for engaging said elongate articles;

each of said elongate articles being engaged by a pair of said chain caps, said conformal surfaces of said chain caps engaging opposing sides of said elongate articles;

a first planar array of said elongate articles, said first planar array of objects being disposed in a roughly parallel fashion with pairs of said chain caps being disposed in side-by-side relationship;

a second planar array of said elongate articles with pairs of said chain caps disposed on opposing sides thereof, said second planar array of articles being formed by stacking chain caps of said second array of articles atop said chain caps of said first planar array of objects, whereby said interfitting surfaces on said chain caps of said first and second arrays of articles interengage to prevent lateral movement of said chain caps;

said interfitting surfaces and said conformal surfaces being disposed on opposing sides of said chain cap, said interfitting surfaces comprising first, second and third projections extending from one side of said chain cap, said third projection extending between said first and second projections on each chain cap stacked thereatop for stabilizing each of said chain caps in a lateral direction when a plurality of said chain caps are stacked with said interfitting surfaces facing; and a clamping tension band for encompassing said chain caps of said first and second planar arrays of elongate objects.

* * * * *